United States Patent
Le Garjan et al.

(10) Patent No.: US 12,197,952 B2
(45) Date of Patent: Jan. 14, 2025

(54) METHOD FOR CONTROLLING MEMORY RESOURCES IN AN ELECTRONIC DEVICE, DEVICE FOR CONTROLLING MEMORY RESOURCES, ELECTRONIC DEVICE AND COMPUTER PROGRAM

(71) Applicant: Thomson Licensing, Cesson-Sevigne (FR)

(72) Inventors: Bruno Le Garjan, Cesson-Sevigne (FR); Sebastien Crunchant, Cesson-Sevigne (FR); Thierry Quere, Cesson-Sevigne (FR)

(73) Assignee: Thomson Licensing, Cesson-Sevigne (FR)

( * ) Notice: Subject to any disclaimer, the term of this patent is extended or adjusted under 35 U.S.C. 154(b) by 479 days.

(21) Appl. No.: 17/770,669

(22) PCT Filed: Oct. 13, 2020

(86) PCT No.: PCT/EP2020/078760
§ 371 (c)(1),
(2) Date: Apr. 21, 2022

(87) PCT Pub. No.: WO2021/078585
PCT Pub. Date: Apr. 29, 2021

(65) Prior Publication Data
US 2022/0365823 A1    Nov. 17, 2022

(30) Foreign Application Priority Data
Oct. 25, 2019 (EP) ..................... 19205506

(51) Int. Cl.
G06F 9/46 (2006.01)
G06F 9/48 (2006.01)
G06F 9/50 (2006.01)

(52) U.S. Cl.
CPC ............ *G06F 9/5022* (2013.01); *G06F 9/485* (2013.01); *G06F 9/5016* (2013.01); *G06F 2209/504* (2013.01)

(58) Field of Classification Search
None
See application file for complete search history.

(56) References Cited

U.S. PATENT DOCUMENTS 6,938,254 B1 * 8/2005 Mathur ............... G06F 9/44594
718/104
10,552,320 B2 * 2/2020 Zhou ..................... G06F 3/0604
(Continued)

OTHER PUBLICATIONS

Kobayashi et al; A Memory Management System to Reflect User Behavior and Preference; IEEE 2006 (Year: 2006).*
(Continued)

*Primary Examiner* — Bing Zhao
(74) *Attorney, Agent, or Firm* — Vincent Edward Duffy

(57) ABSTRACT

The disclosure relates to a method and apparatus including setting a memory swap size limit, the limit being lower than a memory swap size defining a maximum size of a part of said memory resources used for swap, obtaining a score for at least one running program, a high score corresponding to a low priority level, obtaining monitoring information representative of a monitored activity of the program during a time period and of a learnt user's habit of use of the program, including a number of times the program gained the focus within the time period. The disclosure also includes deriving a score delta from information with a decrement value to the score delta at each focus gained by the program, adjusting the score by adding the delta, and terminating execution when memory swap size limit is reached and the adjusted score reaches a memory swap size limit threshold.

10 Claims, 2 Drawing Sheets

(56) References Cited

U.S. PATENT DOCUMENTS

| | | |
|---|---|---|
| 2008/0168235 A1 | 7/2008 | Watson et al. |
| 2012/0324481 A1 | 12/2012 | Xia et al. |
| 2018/0109469 A1 | 4/2018 | Nazakawa et al. |
| 2019/0146699 A1 | 5/2019 | Apparao et al. |

OTHER PUBLICATIONS

Goldwyn Rodrrigues, "Taming the OOM Killer", LWN.net, Feb. 4, 2009, URL:lwn.net/Articles/317814/ (retrieved on Mar. 30, 2022).

Anonymous, Low Memory Killer Daemon (lmkd) | Android Open Source Project, Sep. 5, 2019, URL: source.android.com/devices/tech/perf/lmkd (retreived on Mar. 30, 2022).

\* cited by examiner

METHOD FOR CONTROLLING MEMORY RESOURCES IN AN ELECTRONIC DEVICE, DEVICE FOR CONTROLLING MEMORY RESOURCES, ELECTRONIC DEVICE AND COMPUTER PROGRAM

This application claims the benefit, under 35 U.S.C. § 365 of International Application PCT/EP2020/078760, filed Oct. 13, 2020, which was published in accordance with PCT Article 21(2) on Apr. 29, 2021, in English and which further claims the benefit of priority application EP19205506.9, filed on Oct. 25, 2019.

1. FIELD OF THE INVENTION

The present disclosure relates to a method for controlling memory resources of an electronic device such as a set-top-box or a mobile phone.

2. BACKGROUND

Electronic devices having limited memory resources cannot function in a reliable manner when the memory resources have run out.

In an Android context or any other multi applications system operating on an electronic device, many applications or services, standing each in its process, are alive simultaneously. One application has the focus, while the others are running in background, doing background work or waiting for getting back the focus upon user request.

In a well-known manner, applications, services and/or programs are each affected a score or priority by an application manager (AM), which maintains the scores and makes them evolve dynamically with time, depending for instance on when the applications are launched, when they gain or lose focus and for how long etc. By convention in this document, the higher the score, the lower the priority.

In these systems, a mechanism, called "Low Memory Killer" (LMK) ou "Low memory Monitor" checks memory occupation and decides to kill some higher scores applications to prevent any lack of memory that would lead to a memory allocation failure.

Typically, a decision of killing higher scores applications is made when reaching a predetermined threshold of used memory.

Sometimes swap space may be used to apparently extend the memory of the electronic device. Swap space is a portion of a hard disk drive (HDD) that is used for virtual memory. Virtual memory is the use of space on a HDD to simulate additional main memory. This additional space is used to hold portions of the operating system, programs and data that are currently in use or that are frequently used. Physically, main memory consists of Random-Access Memory (RAM) chips that are combined into modules which, in turn, are inserted into slots on the motherboard (i.e., the main circuit board) on the electronic device. The times required to access different addresses (i.e., locations) in RAM are extremely short and nearly steady, in contrast to the longer and varying times required for accessing locations on the HDD and other storage devices.

In order to free up space in memory, an operating system with a virtual memory capability transfers data that is not immediately needed from memory to the HDD; when that data is needed again, it is copied back into memory. That is, when free memory is low, that is if there are several programs simultaneously opened or if one very large program is in use, a computer with virtual memory enabled will swap data to the HDD and back to memory as needed, thus, in effect, increasing the total system memory.

Swap space is usually a dedicated partition (i.e., a logically independent section of a HDD) that is created during the installation of the operating system. Such a partition is also referred to as a swap partition. However, swap space can also be a partition of the RAM of the electronic device, like for instance swap space called ZRAM in the operating system Linux. Systematically, RAM swap space is used in combination with compression/decompression of the swapped data. For instance, the observed compression ratio with a 1z4 compression method is generally about 3. In this regard, it is important to understand that the RAM swap space size can be set to e.g. 1 Gbytes, but that in fact this value is a maximum size of the data that can enter in this swap space before compression. Swap RAM occupation thus depends on what entered in it. For example, 300 Mbytes entered in such a RAM swap space occupies about 100 MBytes.

The bigger the RAM swap space, the higher the software memory. However, the extension of memory size by swap has a cost in terms of CPU, when data enters into swap, is read from swap, or is removed from swap. It is also observed that, when the swap memory space is closed to be full, the amount of used CPU dramatically increases, leading to slowness and freeze of the electronic device, which affects the quality of the user experience.

When swap space is used, a decision of killing higher scores applications may also be made when reaching a predetermined memory pressure.

Memory pressure is defined as a ratio between used memory and software used memory, expressed in percentage (%). Software used memory is the size of RAM as allocated by the software and the used memory is the RAM space size really taken from the system after swap into a RAM swap space with compression. In other words, if no swap is activated, memory pressure is of 100%, whereas, if swap is activated, current memory pressure is below, for example about 80%. Two different thresholds L1 and L2, with L1<L2 may be used to configure the way decisions are made by the LMK, a different behavior being configured when memory pressure is below L1, between L1 and L2 or above L2.

However, these solutions have several disadvantages. First, killing higher scores applications when reaching one or more memory thresholds is very static and not adapted to swap. As a matter of fact; when the RAM swap space is nearly full, performances of the electronic device are very bad as data constantly enter and leaves the swap space and requires a lot of CPU resources.

Second, killing higher scores applications based on two thresholds related to memory pressure is not efficient either, because these thresholds are not easy to tune. The impact of threshold settings on performance is dependent on the RAM swap space size and it is therefore difficult to be a generic solution working well in all cases.

The present invention has been devised with the foregoing in mind.

3. SUMMARY

According to a first aspect of the invention there is provided a computer implemented method for controlling memory resources of an electronic device, said method comprising:

setting at least one memory swap size limit, said memory swap size limit being lower than a memory swap size defining a maximum size of a part of said memory resources used by said electronic device for swap, called swap memory space; and obtaining a score for each program of a plurality of programs running on said electronic device, a high score corresponding to a low priority level;

obtaining monitoring information, said information belonging to a group comprising:
an information representative of a monitored activity of the program during a predetermined time period,
an information representative of a learnt user's habit of use of the program, said information comprising a number of times the program gained the focus within the predetermined time period;

deriving a dynamic score delta from said monitoring information, said dynamic score delta being positive or negative, a score decrement value being applied to said dynamic score delta at each focus gained by the program;

adjusting the obtained score of said at least one program by adding said dynamic score delta to the obtained score; and terminating an execution of a program of said plurality, when said memory swap size limit is reached and said adjusted score associated with said program is equal to or higher than a priority threshold associated with said reached memory swap size limit.

With the above-mentioned method, the swap size limit is not exceeded or exceeded for a short time only. Thus, such a solution avoids to have a nearly full swap memory space that slows down the device.

Therefore, the method of the invention offers a better quality of experience to the end users of an electronic device since the memory resources of the electronic device are managed in such a way that a situation in which the swap space is nearly full or full and the CPU is highly busy with entering and exiting data from the swap memory, is avoided. A reliable functioning of swap is thereby ensured without slowing down the electronic device.

Advantageously, the scores are set by an application manager and notified to device implementing the method.

With the above-mentioned method, preference can be given in a dynamic way following a monitoring of actual use or a beforehand learning of user's habits.

For instance, frequently used applications can be favorized. Short usage application like weather forecast may be favorized compared to long usage applications by measuring time with focus. Conversely, long starting applications may be unfavorized.

Such a learning may be done in general for the device regardless of the user, or conversely for each user using this device, based on any ID (account ID, face recognition, enter code, question raised to the user) or for a period of time (one day or one week), or from boot.

As well, a dynamic score delta may be calculated based on a number of times a running program gained the focus during a predetermined period of monitoring. For instance, the score delta is obtained by multiplying this number of times by a predetermined focus score delta.

In another aspect, said method further comprises:
obtaining monitored information comprising an amount of used memory swap space during a predetermined time period, swap being used by said electronic device depending on a configured value, called swappiness, said swappiness defining how much and how often content is copied by said electronic device into the swap memory space, the higher the swappiness, the more swap being used; and adjusting said swappiness using said monitored information, said swappiness being decreased when said monitored information is below a predetermined threshold and increased when said monitored information is over said predetermined threshold.

The way swap is used by the electronic device is set by a configuration value of swappiness that defines how much (and how often) the processor will copy RAM contents to swap. A default value may be set to "60", but swappiness can take anything from "0" to "100". The higher the value of the swappiness parameter, the more aggressively the processor will swap.

An amount of used memory swap space may be measured over a fairly long period of time, for instance of one day. The period can be fixed or dynamically changed, e.g. becomes shorter the average filling level of the swap memory space is getting higher. When the storing of data in swap is not really needed by the electronic device, for instance when a threshold of 50% of the swap memory space is not reached, the swappiness may be decreased. The advantage is to allow better performances of the device, since CPU is less used by swap operations and made available for other operations. On the contrary, when said threshold of 50% is exceeded, then the swappiness may be increased.

In another aspect, said method further comprises, when said memory swap size limit SL is not reached:
Obtaining a level of used swap memory;
Obtaining at least one intermediate memory swap size limit, lower than said memory swap size limit, and an associated intermediate priority threshold; and
Terminating at least one program having a score equal to or higher than said associated intermediate priority threshold, when said memory swap used size has reached said associated intermediate memory swap size limit.

Such a method decides to kill a program having a score higher than a minimum, when the swap memory limit is still not reached, but approaching. An advantage is to anticipate when the swap memory limit will be reached and try to avoid it. More than one intermediate memory swap size limits may be defined. For instance, the range of memory swap size values may be divided into a number of regular or irregular steps or intervals and as many intermediate thresholds as intervals may be defined, each associated with a corresponding minimal score limit, lower than the previous one when getting closer to the swap memory size limit.

With the invention, the processes are gradually killed as the memory size limit is approached, lower priority level programs, that is higher scored programs being killed first.

In yet another aspect, said method further comprises, for said plurality of programs:
Obtaining configuration information, said information belonging to a group comprising:
a list of factory embedded programs, comprising for each program an associated score delta;
a list of favorite and/or unfavorite programs, comprising for each program an associated score delta;
a score decrement value for a program at focus;
storing said configuration information in memory,
deriving, for at least one program of said plurality a static score delta;
adjusting the obtained score by adding said static score delta to the obtained score,
said terminating comprising deciding to terminate a program of said plurality based on the adjusted score.

An advantage is to favor certain programs over others within the memory controller.

In this embodiment, preference is given in a static way by configuration. For instance, the lists are predetermined, by the manufacturer or the client.

The score delta may be negative for a favorite program and positive for an unfavorite one. An advantage is that a current score is easily derived from the score obtained initially from the application manager, by simple additions or subtractions. The delta score may be positive or negative. For instance, a program belonging to a list of favorite programs may benefit from a predetermined negative score delta. On the contrary, the obtained score of an unfavorite programs may be reduced by a positive score predetermined delta.

In yet another aspect, said adjusting comprises determining a current score by adding said static score delta and said dynamic score delta to said obtained score and said terminated uses said determined current score.

An advantage of using both a dynamic adjustment score based on monitoring/learning and a static adjustment based on configuration, is that decision of terminating is made by taking all types of constraints into account.

In yet another aspect, the method comprises:
building and storing a list of programs running or having run on the electronic device since a predetermined period of time, said list comprising at least, for each program, an identifier of said program, said obtained score, said static score delta, said dynamic score delta and said current score; and
said list is used by said terminating.

An advantage is to facilitate the choice of the programs to be killed since all the relevant information is available in the list.

The predetermined period of time may be longer or shorter that current time—boot time, in this case the list must be stored in NVRAM periodically and/or when going to standby. The unique identifier is typically the program name as it must be unique and stable after reboot.

In yet another aspect, the obtained score stored in said list for a program is updated upon receipt of a notification of change, said notification comprising the identifier of the program and the changed score; and the current score is updated based on the changed score.

In a well-known manner, the scores values are defined and dynamically managed by the application/program manager. At each score change for a particular program, the application manager notifies the low memory killer LMK, which updates the list accordingly.

In yet another aspect, said configuration information comprises a list, called whitelist, of programs than cannot be killed, comprising for each listed program an associated amount of memory resources and said terminating cannot decide to terminate said program, as long as a use of memory resources by said program does not exceed said predetermined maximal amount of used memory resources.

Said information is a configuration information that may be defined by a client of the electronic device. An advantage is to preserve some programs from being killed whatever their scores. For instance, these programs have been beforehand identified by a user or the manufacturer of the electronic device.

The predetermined amount of used memory resources defines a memory level that the running program should not exceed. When the whitelist information is set to the maximal value of 0xFFFFFF, the program cannot be chosen for termination. Conversely, when it is set to null, the program is not considered as whitelisted.

Preferably, this should be used only for few programs.

This amount of resources may be stored in a whitelist field associated with the program in the list LMK_APPS_LIST maintained by the LMK.

In another aspect, said monitoring information comprises for a program of said plurality of programs, an information comprising an amount of swap resources used by said program.

Inspecting swap occupation per process allows to favorize low swap consumer or conversely high swap consumers. As a matter of fact, killing a low swap program will not free a lot of swap memory. Conversely, killing a high swap program may free more swap space, but at the price of a greater start-up time when relaunching the program.

Another object of the invention concerns a device for controlling memory resources of an electronic device, said device comprising a processor configured to:
setting at least one memory swap size limit, said memory swap limit being lower than a memory swap size defining a maximum size of a part of said memory resources used by said electronic device for swap, called swap memory space; and
obtaining a score for each program of a plurality of programs running on said electronic device, a high score corresponding to a low priority level;
obtaining monitoring information, said information belonging to a group comprising:
an information representative of a monitored activity of the program during a predetermined time period;
an information representative of a learnt user's habit of use of the program, said information comprising a number of times the program gained the focus within the predetermined time period;
deriving a dynamic score delta from said monitoring information, said dynamic score delta being positive or negative, a score decrement value being applied to said dynamic score delta at each focus gained by the program;
adjusting the obtained score of said at least one program by adding said dynamic score delta to the obtained score; and
terminating an execution of at least one program of said plurality, when said memory swap size limit is reached and said adjusted score associated with said at least one program is equal to or higher than a priority threshold associated with said memory swap size limit.

In another aspect, said swap memory space belonging to RAM memory resources, swapped data are compressed before being stored in said swap memory space.

An advantage is that the memory extension is more important.

Such a device may implement any aspect of the previously presented method.

The invention further relates to an electronic device comprising a device for controlling memory resources of said electronic device according to the invention.

The electronic device is for example a set-top-box, a tablet, a smartphone or a PC (for "Personal Computer"). A program running on the electronic device is for example a software managing the bus of the electronic device, one or more software managing VoIP (Voice over IP) service, a web-browser, a game, a TV zapper program, etc.

One or more of the present embodiments also provide a computer program comprising instructions which when executed by one or more processors cause the one or more processors to carry out the above method. One or more of the present embodiments also provide a computer readable storage medium comprising instructions which when executed by a computer cause the computer to carry out the above method. One or more of the present embodiments also provide a computer readable medium containing data content generated according to the above method.

4. BRIEF DESCRIPTION OF THE DRAWINGS

The present disclosure can be better understood with reference to the following description and drawings, given by way of example and not limiting the scope of protection, and in which.

The components in the figures are not necessarily to scale, emphasis instead being placed upon illustrating the principles of the invention.

5. DETAILED DESCRIPTION

Figure 1:
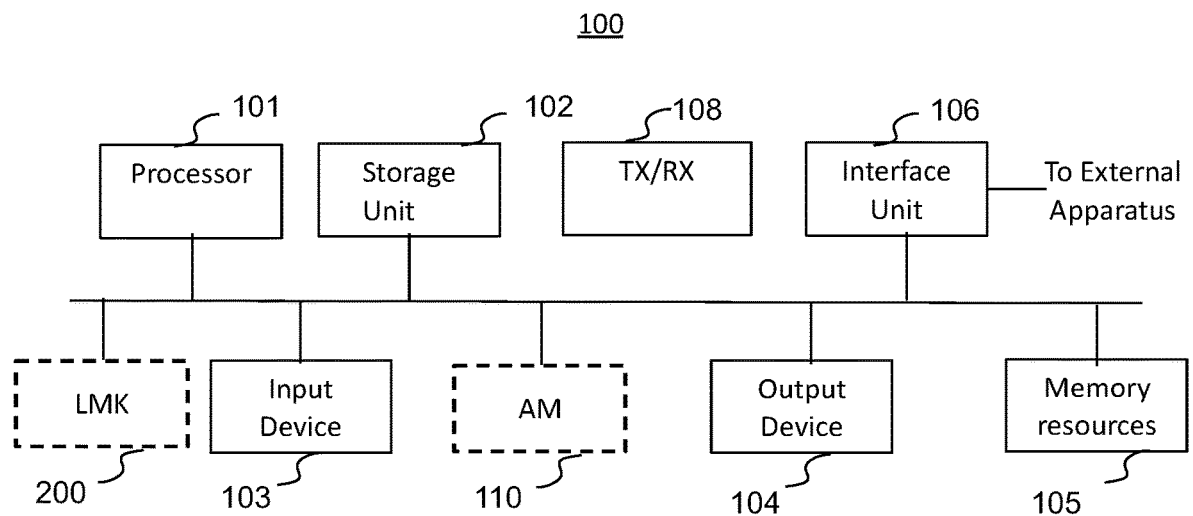
FIG. 1 depicts an electronic device executing a method according to an embodiment of the invention.

It should be understood that the elements shown in FIG. 1 may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software-based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for instructional purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

In the following description, example methods for controlling memory resources of an electronic device, such as a set-top-box or mobile phone, such as a smartphone, are described, as well as a device 200 performing the methods. For purposes of explanation, various specific details are set forth in order to provide a thorough understanding of preferred embodiments. It will be evident, however, to one skilled in the art that the present disclosure may be practiced without these specific details.

An electronic device, as represented on FIG. 1, comprises a processor 101, a storage unit 102, an input device 103, a display device 104, memory resources 105 such as RAM and an interface unit 106 which are connected by a bus 107. Of course, constituent elements of the computer apparatus 100 may be connected by a connection other than a bus connection.

The processor 101 controls operations of the electronic device 100. The storage unit 102 stores at least one program capable of managing the memory resources 105 to be executed by the processor 101, and parameters used by computations performed by the processor 101, intermediate data of computations performed by the processor 101, and so on. The processor 101 may be formed by any known and suitable hardware, or software, or a combination of hardware and software. For example, the processor 101 may be formed by dedicated hardware such as a processing circuit, or by a programmable processing unit such as a CPU (Central Processing Unit) that executes a program stored in a memory thereof.

The storage unit 102 may be formed by any suitable storage or means capable of storing the program, data, or the like in a computer-readable manner. Examples of the storage unit 102 include non-transitory computer-readable storage media such as semiconductor memory devices, and magnetic, optical, or magneto-optical recording media loaded into a read and write unit. The program causes the processor 101 to perform a process for managing the memory resources 105 according to any embodiment of the present disclosure as described hereinafter with reference to FIG. 3. In another embodiment, the electronic device 100 comprises a device LMK, 200 for controlling its memory resources, which is implemented as a processing circuit connected to the other parts of the electronic device 100 by the bus 107. For instance, the device LMK, 200 has the structure illustrated by FIG. 2.

The input device 103 may be formed by a keyboard, a pointing device such as a mouse, or the like for use by the user to input commands. The output device 104 may be formed by a display device to display, for example, a Graphical User Interface (GUI), images generated according to an embodiment of the present disclosure. The input device 103 and the output device 104 may be formed integrally by a touchscreen panel, for example.

The interface unit 106 provides an interface between the apparatus 100 and an external apparatus. The interface unit 106 may be communicable with the external apparatus via cable or wireless communication. In an embodiment, the external apparatus may be a USB hard drive.

In the case where the electronic device 100 is a set-top-box, it may for instance comprise one or more TX/RX circuit(s) 108 for a wireless/cable/terrestrial/satellite communication.

Such an electronic device 100 has a limited memory resources and cannot function in a reliable manner when the memory resources have run out or when swap is used, the swap memory space is full or nearly full.

Figure 2:
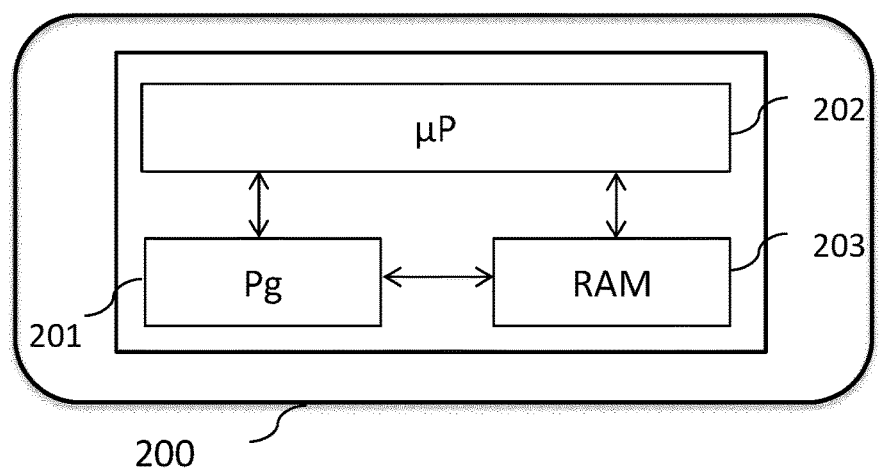
FIG. 2 depicts an exemplary structure of a device for controlling the memory resources of an electronic device according to an embodiment of the invention.

In relation with FIG. 2, an exemplary material structure of a device LMK, 200 for controlling memory resources of the electronic device 100 according to an embodiment of the invention is presented. The device 200 includes a RAM memory 203 (e.g. RAM), a processing unit 2022 equipped with a processor, for example, and controlled by a computer program, representative of a module for setting at least one memory swap limit, said memory swap limit being lower than a memory swap size defining a maximum size of a part of said memory resources used by said electronic device for swap, called swap memory space; a module for obtaining a score for each program of a plurality of programs running on said electronic device and a module for terminating an execution of at least one program of said plurality, when a level of free memory resources is reached, or when at least one of said memory swap limits is reached and a score associated with said at least one program is equal to or higher than at least one priority threshold (PT). On initialization, for example, the code instructions of the computer program are loaded into RAM 203 before being executed by the processor of the processing unit 202. RAM 203 contains data such as the memory and/or swap thresholds, the score thresholds, the configuration information $I_{Conf}$ and the monitoring information $I_{Monit}$. In an embodiment, the configuration and monitoring information are stored by the LMK in a list LMK_APPS_LIST, this list being maintained over time by the LMK.

Figure 3:
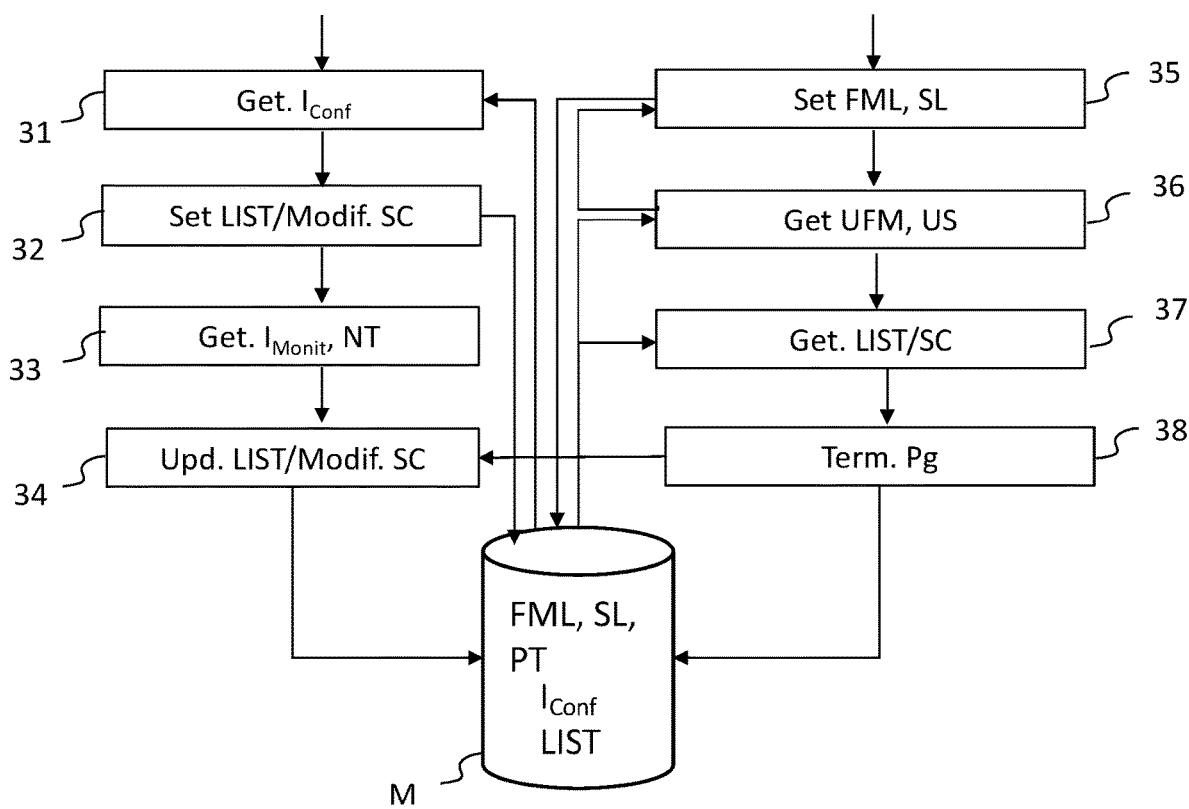
FIG. 3 depicts the steps of a method for controlling the memory resources of an electronic device according to another embodiment of the invention.

FIG. 2 illustrates only one of several possible ways in which the device 200 for controlling memory resources can be constructed to perform the steps of the method according to the invention, an embodiment of which will now be detailed hereinafter, in conjunction with FIG. 3.

In the following, we will use the terms program and application interchangeably. A process is an instance of a program running in a computer or processor. A new process is started when a program is initiated.

There are at least two different categories of programs running on the electronic device 100: factory embedded programs and downloaded programs. Among them, some programs can be terminated and other that cannot be terminated. For example, an operating system is a program that cannot be terminated whereas a program managing file sharing is a program that can be terminated.

In the following, we more specifically consider the running programs that can be terminated.

In this embodiment, the method according to the invention may be implemented by a Low Memory Killer LMK.

In a step 31, configuration information $I_{Conf}$ is obtained by the LMK.

1. Configuration Information

Configuration information comprises a plurality of predetermined static characteristics or features, which are stored in memory and read by the LMK at boot of the electronic device or when needed. For instance, configuration information is stored in a specific structure of memory, or object, comprising some attribute or properties, as well known in relation with Android operating system.

Advantageously, these features are stored in a special kind of memory, called NVRAM (for "Non Volatile Random Access Memory") that retains stored data even if the power is switched off. This is in contrast to dynamic RAM (DRAM) and static RAM (SRAM), which both maintain data only for as long as power is applied. Currently, the best-known form of NV-RAM is flash memory. Of course, the content of NVRAM may be copied in RAM at boot time.

Theses configuration features are static and their values are not modified by the LMK. Nevertheless, they may be updated between two boots of the electronic device 100, for instance when a new version of software has been downloaded.

These configuration features comprise at least two types of information, some examples of which are described hereinafter:

Information related to thresholds of memory/swap to be used by the LMK for deciding when a program of a plurality of programs running on the electronic device, has to be killed. A minimum level of free memory FML and a maximum swap memory limit SL are defined. Beforehand, a size of the memory swap space SSize has been configured in a well-known manner and for example set to 1 Gbytes. The swap memory limit SL is always set lower than the swap space size. For instance, SL is set to 600 Mbytes. The related properties are:

At least one minimum level of free memory FML: prop.lmk.free_memory_limit: 100;

At least one limit of used swap memory size SL: prop.lmk.swap_limit: 620;

At least one default priority threshold PT: prop.lmk.min_score: 1.

Preferably, a priority threshold is associated with each FML or SL.

Advantageously, as may detailed hereinafter, several couples (FML, PT) and (SL, PT) may be defined.

For example, for (SL, PT) the configuration values may be (620, 0), (580, 100), (550, 200°, (500, 300) and (400, 800).

For (FML, PT), the following values may be set to: (20, 0), (40, 100), (60, 200), (80, 300) and (100, 800).

An advantage is that a progressive strategy of killing may be used.

Advantageously, swap in RAM is used, for example ZRAM.

For example, the RAM swap space size is set to 1 Gbytes and the ZRAM swap memory limit SL is always set lower than the swap space size. For instance, SL is equal to 620 Mbytes. SL Information related to privileged or non-privileged programs and to specific priority rules to be applied to these programs when running on the electronic device:
  a list, called Whitelist, of programs that cannot be killed. This list may be defined by the manufacturer or by a client.
  This list may be stored as a static property in a property that carries the name of the program and, optionally, an amount of used memory resources (in Mbytes) that the program should not exceed. If the program uses memory over this level, then it may be killed as a not whitelisted program:
  prop.lmk.whitelist: AppW1,100+AppW2,120;
  a list of favorite programs, called FavoriteList, that benefit of a preferential treatment and/or a list of unfavorite programs, called UnfavoriteList, that are treated adversely. To this end, a favorite program is associated with a negative score delta for decrementing a score associated with the program and, conversely, an unfavorite program is associated with a positive score delta for incrementing its score. This score delta may be common for all the favorite/unfavorite programs or configured per program.
  Optionally, only downloaded programs may be configured as favorite or unfavorite and programs embedded at launch cannot.
  The favorite and unfavorite lists are each defined in a dedicated property that carries their name and the score adjustment:
  prop.lmk.favorite_apps: AppsF1,−50+AppsF2,−50+AppsF3,−100
  prop.lmk.unfavorite_apps: AppsU1,+50+AppsU2,+50+AppsU3,+100;
  Alternately, only one favorite list may be defined, with positive or negative score deltas, a negative score delta being assigned to a favorite program, whereas a positive score delta is assigned to an unfavorite program.
  a list of factory embedded programs:
  prop.lmk.embedded_apps: AppE1, AppE2, AppE3
  The programs are listed by names.
  A score increment configured for non-factory embedded programs:
  prop.lmk.non_embedded_apps_score_increment
  A score decrement value applied at each focus gained by a program to learn a user's habit:
  prop.lmk.focus_score_decrement: −10

All the above-mentioned properties are static. They are obtained during the configuration step 31 and cannot be changed by the LMK.

2. Dynamic List of Programs and Associated Attributes LMK_APPS_LIST

In a step 32, a list, called LMK_APPS_LIST, is set up by the LMK. At first start of the electronic device 100, this list is empty. In memory, this list may have the structure of a table comprising items comprising information fields. An item corresponds to a program running on the electronic device, and its associated fields to attributes of this program. For instance, it may be implemented in C language. It may be stored in RAM for a learning period of time starting at boot, or in NVRAM for a longer learning period, and is maintained by the LMK.

Each time a program is launched by the electronic device, a new item is created by the LMK in the list LMK_APPS_LIST.

The list LMK_APPS_LIST comprises at least the following information fields, specific to each program:
  The program name (unique ID);
  The current process id, which changes when the program is killed and relaunched. It is set to 0 if the program is not alive;
  a score AM-SC.

All the programs currently running on the electronic device 100 are identified by a program or application identifier AM-ID. Typically the identifier is the pid (Process-ID) and the Program name, that is the unique ID, can be obtained from the pid. If a program is launched, killed and relaunched, its pid changes, but its name does not change. Typically, this identifier is received from a program or application manager AM 110, in charge of managing the running programs on the electronic device. For instance, this application manager AM is implemented as a processing circuit which is connected to the other parts of the electronic device 100 by the bus 107 or, as an alternative, it is implemented as a program loaded in the storage unit 102 and causes the processor 101 to perform a process for managing the programs running on the electronic device 100.

Scores AM-SC associated with the running programs may also be received from the application manager AM in association with its identifier AM-ID, in a specific or common notification.

In the following, a high score corresponds to a low priority level. Of course, the reverse convention may have been chosen.

For instance, the scores AM-SC have values located in a range between −800 to 1000. The null value is assigned to a program at focus. System programs usually have a higher priority, and are thus assigned negative scores.

Advantageously, the list LMK_APPS_LIST may further comprise, for each program, the following static attributes or fields:
  a Whitelist field set to the value of memory level associated with this program when listed in the above-mentioned WhiteList, or the value 0xFFFFFF if no value of memory level has been set in the Whitelist, or the value 0 for a non-whitelisted program.
  a score static adjustment "lmk_score_static_delta", which can be positive or negative), as calculated from the previously defined static configurations properties:
  prop.lmk.favorite_apps
  and prop.lmk.embedded_apps
  and prop.lmk.non_embedded_apps_score_increment.

The values of these attributes are filled with the configuration information stored in the configuration properties.

For each privileged or non-privileged program identified in at least one of these properties, a static score delta may thus be derived from the above-mentioned score increments and decrements which are stored as another static property associated with the identifier of the program:

In addition, the list LMK_APPS_LIST further comprises some dynamic attributes whose values may be determined based on monitoring information $I_{Monit}$ collected for a predetermined period of time. This monitoring information is periodically obtained by the LMK in a step 33 and accordingly triggers a dynamic update of some dynamic attributes or fields of the list.

Advantageously, these dynamic attributes of the listed programs may comprise:
- a score dynamic adjustment "lmk_score_dynamic_delta", which can be positive or negative. It may be determined from monitoring Information obtained by the LMM, as will be described in more details hereinafter.
- a current score value "lmk_score", representative of the score to be used for making a decision about which program(s) should be killed. A value of this current score may be calculated in the following way:
lmk_score=AM-SC+lmk_score_static_delta+lmk_score_dynamic_delta.

Advantageously, the following rule may additionally be applied:
- If (AM-SC>0) then lmk_score=MAX(lmk_score, 1). This is a correction to ensure that the current program will be killed before the application currently at focus (score=0).

Therefore, in a step 34, the received score AM-SC of a program may be modified by adding the value of this static score delta defined by configuration and the value of this dynamic score delta based on monitoring information obtained for a period of time. The modified value of score is then stored in the field "lmk_score" of the corresponding program in the list. This stored value stands as the current score of the program until new monitoring information is received and triggers a new update of the value of the field "lmk_score".

3. Application Manager Notification

As the Application Manager AM dynamically manages the score AM-SC of all running programs when they are launched, they gain the focus, they lose the focus, after some delay not get the focus, etc, the score value AM-SC associated with a running program may change over time.

At each score change of a program, the AM notifies the LMK of the change. Such a Notification may be received from the AM by the LMK at any time. It may comprise at least the new score value AM-SC in association with the identifier AM-ID of the program. For instance, when a program gains the focus, the AM sends a notification to the LMK comprising the identifier APP-ID of the program and the score AM-SC set to 0. This is a well know current behavior in Android for example.

It should be noted that there are other kinds of event that may trigger an update of the list LMK_APPS_LIST by the LMK. For instance, when the LMK detects that the execution of a program is ended, upon reception of an end notification from the AM, comprising the identifier of the ended program, it may update a status of the program in the list, for instance by setting a value corresponding to "dead" instead of "alive". Alternately, the process identifier of the program is set to null.

4. Monitoring Information

Monitoring information $I_{Monit}$ refers to data or measurements resulting from an observation of a behavior of the running programs within a predetermined period of time. It may be obtained from a dedicated monitoring unit or circuit embedded in the electronic device 100 or, alternately, in the LMK itself.

For instance, monitoring information comprises a number of times a program gained the focus within the predetermined period of time. This is obtained from a notification received from the AMM with score 0 associated with the identifier of the program. The period of time may be set to one day, one or two weeks. It may be configurable.

This specific example of monitoring information may be used to derive a value of the dynamic score delta "lmk_score_dynamic_delta" to be used for adjusting the current score lmk_score of the running program in step 34.

This dynamic score delta may be calculated by multiplying the prop.lmk.focus_score_decrement by the monitored number of focuses within the predetermined period. Thus, if the program gained the focus 2 times within the period of observation, the score delta lmk_score_dynamic_delta is set to 2×(−10)=−20. For instance, a minimum value may be set to −100 so as to avoid a too abrupt drop of the score of the program.

Another examples of monitoring information are representative of:
- a level of used power for battery saving. Preferably, programs using a lot of power for battery saving are disadvantaged by increasing their scores;
- a number of times the program was launched during the monitoring period of time. For instance, programs that are launched frequently may be favorized by decreasing their score;
- An amount of data stored in swap for the program at the moment of making the killing decision or during the last monitoring period of time. Preferably, low swap consumers may be unfavorized by increasing their scores. In this way low swap programs may be killed first, as killing high swap consumers will have an impact at next launch;
- a start-up duration of the program. Preferably Long starting programs have their score decreased.
- a duration of time with focus of the program. Short usage App (e.g. weather forecast) can be favorized compared to long usage App. (measured by time with Focus);

etc.

This monitoring information thus provides a simple learning of user's habits over time, and may be done:
For the electronic device,
or for each user using the electronic device;
for a period of time, like one day or the week, or from boot;
based any ID (Google account, Face recognition, enter code, question can be raised to user).

This monitoring information $I_{Monit}$ may be stored in a memory M of the LMK 200 or in a memory of the electronic device 100, for instance as attributes of items of a monitoring list, an item of said list corresponding to a program.

As already mentioned, both monitoring list and LMK_APP_LIST may stand in RAM which means that they will be suppressed at each boot, as the RAM is reset. This corresponds to a boot policy (i.e the learning is from boot only, so restarted at each boot).

In this case, information relative to a number of times a program gained the focus or information relative to a number of times a program was launched during the monitoring period may simply be stored as a counter, reset at each boot.

It should be noted that, even with a boot policy, some static attributes of the LMK_APPS_LIST may keep their value at next boot time, because they have been configured once and for all. This is the case of the program identifier for instance. These attributes may be stored in a dedicated structure in NVRAM, for instance flash memory. For another type of learning policy, called period of time policy, these lists may stand in another kind of memory, for instance a NVRAM that retains stored data even if the power is switched off. For an easier access to data a copy in RAM may be done at boost.

With this policy, information relative to a number of times a program gained the focus or information relative to a number of times a program was launched during the monitoring period may advantageously be stored as a list or sequence of dates. In this way, the value of dynamic fields of the LMK_APPS_LIST, such as for instance the dynamic score delta lmk_score_dynamic_delta may be computed on a sliding period starting before the latest boot.

With this policy, the predetermined period of time for learning may be chosen per day, per week etc. The learning period of time may also be adjusted so as to infer a more dynamic or conversely more stable behavior to the LMK.

On the contrary, the AM score fields whose values depend on AM notifications are reset.

With the invention, monitoring information is thus used to learn in a simple way about a user's habits of handling the plurality of programs and this learning is transposed in terms of score deltas.

It should be noted that monitoring information may also be used for as an entry for a machine learning device which would output learnt values for some properties of the list, such as the lmk_score_dynamic_delta, etc. The machine learning device may have been trained using a specific dataset comprising monitoring information collected beforehand. An advantage is that it provides a more elaborated learning.

5. Decision to Kill Some Running Programs

Once configured, the LMK is ready to control the use of memory resources by the running programs, based on information stored in the list LMK_APP_LIST.

Periodically, the LMK determines if a running program should be killed to free some RAM and ZRAM swap memory.

To do so, the LMK executes the following steps:

In a step 36, get information representative of a current level of free memory UFM, that is a size of the part of memory which is not used by the programs running on the electronic device 100, and information representative of a current level of used swap memory "swap_used_size".

For instance, the current level of swap memory is 250 Mbytes, which means that the data stored in the ZRAM swap is 250 Mbytes before compression.

In a step 37, get configuration information regarding:
At least one free memory level or threshold FML;
at least one used swap size limit SL;
score threshold(s) PT associated with said FML and SL; and
for each running program, its current score lmk_score.

In a step 38, decide to terminate at least one running program by comparing the current level of free memory UFM with the free memory threshold FML and the current level of used swap memory US with the predetermined swap size limit(s) SL.

As a first option, we suppose that no level of free memory FML has been reached. Thus, only the level of used swap memory is considered and used for making killing decisions.

If the level of used swap memory has reached at least one of the swap size limits SL, a running program needs to be killed. This program is chosen by the LMK using the current scores lmk_score by comparing each of them with a score threshold PT associated with the reached swap size limit SL.

In a first embodiment, if only one maximum swap size limit SL has been set as well as one associated priority threshold PT, this single priority threshold may be set to 1 or 2. In this way, the running programs having a current score greater than PT=1 or 2 are killed, but the program at focus (lmk-score=0) will not be killed.

Preferably, in a second embodiment, a decision to kill a program may be made as soon as the current level of used swap memory US is approaching but not reaching yet the maximum swap size limit SL. In this case, the considered score threshold may be changed depending on a proximity of the current level of used swap memory to the swap size limit SL. In other words, more than one swap size limits are set, each being associated with a corresponding (intermediate) priority threshold IPT.

This second embodiment allows to kill the running programs progressively.

An example of implementation is now described in more details by the following pseudo-code:

```
int step = (SL / 16);
if (US > SL)                          IPT = 0;
else if (US > SL -step )              IPT = 100;
else if (US > SL -2*step )            IPT = 200;
else if (US > SL -3*step )            IPT = 300;
else if (US > SL -4*step )            IPT = 600;
else if (US > SL -5*step )            IPT = 900;
else if (US > SL -6*step )            IPT = 906;
else score = 0xFFFFFFFF ; // no need for killing a program
```

A specific intermediate priority threshold IPT is thus set for each of the plurality of intermediate swap size limits, as described. In this way, several tests are defined, that the LMK uses it to decide which program of the list LMK_APPS_LIST will be killed. To this end, the following rules are applied:

the program must not be whitelisted or consume more memory than indicated in its whitelist property;
is the highest lmk_score alive program (in case of more than one program having the highest score, choose one of them, for instance the heaviest (the one consuming most memory);
has its current score lmk_score greater than IPT.

If one program fulfills these rules, it is killed, which leads to free some memory from the ZRAM swap space and RAM.

The list is then updated by marking the killed program to indicate that it is dead. For instance, an additional attribute may be stored for each program, with a value representative of "alive" for a running or living program and "dead" for a killed or finished program, or the process ID is set to null. An advantage not to remove the killed program from the list is that learnt information obtained from monitoring about this program is not lost and may be used at next launch.

As a second option, both thresholds of free memory and used swap memory are considered. In this case, and as described in section 1, several couples (FML, PT) and (SL, PT) may have been configured and they are used with the same kind of implementation as described above for the first option, the minimum of both priority thresholds being applied to the program to make the killing decision.

As a third option, only the level of free memory FML is considered and not the swap size limit for deciding which program is to be killed.

Accordingly, the invention also relates to a computer-implemented method for controlling memory resources in an electronic device, said method comprising:

obtaining a score for each program of a plurality of programs running on said electronic device;

terminating an execution of at least one program of said plurality, when a level of free memory resources is reached, and a score associated with said at least one program is equal to or higher than said priority threshold associated with said level of free memory resources.

Advantageously, as described above for the first option, the scores of the programs may be adjusted within the LMK, using configuration information (static score delta) and/or monitoring information (dynamic score delta).

6. Monitoring of Swap Use

Optionally, an amount of data stored in swap space for the plurality of running programs is periodically monitored. The time period of monitoring can be fixed or dynamically changed. For instance, it is shortened when the amount of data stored in swap is higher. The LMK may periodically get this monitoring information representative of a level of used swap as in step 33, and use it to decide whether a configured level of swappiness SW is still appropriate or, on the contrary, needs to be changed.

When swap is not really needed by a user of the electronic device, that is when the monitored level of used swap space remains low and below a predetermined limit UT during the period, for an instance for amount of data stored in swap space set to 50% of the swap memory size, the LMK may decide to decrease swappiness.

An advantage is to allow better performances of the device, since CPU is less used by swap operations and made available for other operations.

Main benefits of this invention are:

The swap is used for more memory and is never almost full to avoid slowness of the electronic device;

Some programs can be favorized based on configuration;

Some programs can be favorized if they are used frequently;

A balance is provided between:

killing early and the navigation will be smooth inside an application, but the programs will be often relaunched when we go back to them;

killing late and the programs will be more rarely relaunched when we come back to them, but the navigation inside a program will be slower sometimes.

is easy to tune by the swap_size_limit(s) SL;

is easy to understand, easy to configure.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. Computer-implemented method for controlling memory resources of an electronic device, said method comprising:

setting at least one memory swap size limit (SL) for a plurality of programs running on said electronic device, said memory swap size limit being lower than a memory swap size defining a maximum size of a part of said memory resources used by said electronic device for swap, called swap memory space;

obtaining a score (AM-SC) for each program of said a plurality of programs running on said electronic device, a high score corresponding to a low priority level;

obtaining monitoring information ($I_{Monit}$), said information comprising at least one of:

an information representative of a monitored activity of the program during a predetermined time period, and an information representative of a learnt user's habit of use of the program, said information comprising a number of times the program gained the focus within the predetermined time period;

deriving a dynamic score delta from said monitoring information, said dynamic score delta being positive or negative, said deriving comprising applying a score decrement value to said dynamic score delta at each focus gained by the program;

adjusting the obtained score (AM-SC) of the said at least one program by adding said dynamic score delta to the obtained score; and terminating an execution of at least one program of said plurality of programs, when said memory swap size limit (SL) is reached and the adjusted score associated with said at least one program is equal to or higher than a separate priority threshold (PT) associated with score value for said plurality of programs corresponding to said reached memory swap size limit.

2. Computer-implemented method according to claim 1, wherein:

said monitoring information comprises an amount of used memory swap space during a predetermined time period, swap being used by said electronic device depending on a configured value, called swappiness, said swappiness defining how much and how often content is copied by said electronic device into the swap memory space, the higher the swappiness, the more swap being used; and said method further comprises:

adjusting said swappiness using said monitored information, said swappiness being decreased when said monitored information is below a predetermined threshold and increased when said monitored information is over said threshold.

3. Computer-implemented method according to claim 1, wherein said method further comprises, when said memory swap size limit (SL) is not reached:

obtaining a level of used swap memory (US); and obtaining at least one intermediate memory swap size limit (ISL), lower than said memory swap size limit (SL) and an associated intermediate priority threshold (IPT) score value; and said terminating comprises terminating at least one program having a score equal to or higher than said associated intermediate priority threshold score value, when said level of used swap memory (US) has reached said intermediate memory swap size limit (ISL).

4. Computer-implemented method according to claim 1, wherein said method further comprises, for said plurality of programs:

obtaining configuration information ($I_{Conf}$), said information belonging to a group comprising at least one of:

a list of factory embedded programs, comprising for each program an associated score delta,
a list of favorite and/or unfavorite programs, comprising for each program an associated score delta, and
a score decrement value for a program at focus;
storing said configuration information in memory,
deriving, for at least one program of said plurality of programs, a static score delta from said associated score deltas; and
adjusting the obtained score (AM-SC) by adding said static score delta to the obtained score, and
said terminating comprising deciding to terminate a program of said plurality when said adjusted score is equal to or higher than said associated intermediate priority threshold.

5. Computer-implemented method according to claim 4, wherein said adjusting comprises determining a current score (lmk_score) by adding said static score delta and said dynamic score delta to said obtained score (AM-SC) and said terminating uses said determined current score.

6. Computer-implemented method according to claim 5, comprising:
Building and storing a list of programs (LMK_APPS_LIST) running on the electronic device since a predetermined period of time, said list comprising at least, for each program, an identifier of said program, said obtained score (AM-SC), said static score delta, said dynamic score delta and said current score (lmk_score);
said list being used by said terminating.

7. Computer-implemented method according to claim 6, wherein:
the obtained score (AM-SC) stored in said list for a program in the list of programs is updated upon receipt of a notification (NT) of change, said notification comprising the identifier of the program and a changed score; and
the current score is updated with the changed score.

8. Computer-implemented method according to claim 4, wherein said configuration information ($I_{Conf}$) comprises a list, called whitelist, of programs than cannot be killed, comprising for each listed program in the whitelist an associated amount of memory resources and said terminating cannot decide to terminate a listed program, as long as a use of memory resources by said program does not exceed a predetermined maximal amount of used memory resources.

9. A device (for controlling memory resources of an electronic device, said device comprising a processor configured to:
set at least one memory swap size limit (SL) for a plurality of programs running on said electronic device, said memory swap size limit being lower than a memory swap size defining a maximum size of a part of said memory resources used by said electronic device for swap, called swap memory space;
obtain a score (AM-SC) for each program of said a plurality of programs running on said electronic device, a high score corresponding to a low priority level;
obtain monitoring information ($I_{Monit}$), said information comprising at least one of:
an information representative of a monitored activity of the program during a predetermined time period, and
an information representative of a learnt user's habit of use of the program, said information comprising a number of times the program gained the focus within the predetermined time period;
derive a dynamic score delta from said monitoring information, said dynamic score delta being positive or negative, said deriving comprising applying a score decrement value to said dynamic score delta at each focus gained by the program;
adjust the obtained score (AM-SC) of the said at least one program by adding said dynamic score delta to the obtained score; and
terminate an execution of at least one program of said plurality of programs, when said memory swap size limit (SL) is reached and said adjusted score associated with said at least one program is equal to or higher than a separate priority threshold (PT) associated with score value for said plurality of programs corresponding to said reached memory swap size limit (SL).

10. A non-transitory computer readable medium having stored thereon instructions that, when executed by at least one processor, perform the steps of:
setting at least one memory swap size limit (SL) for a plurality of programs running on said electronic device, said memory swap size limit being lower than a memory swap size defining a maximum size of a part of said memory resources used by said electronic device for swap, called swap memory space;
obtaining a score (AM-SC) for each program of said a plurality of programs running on said electronic device, a high score corresponding to a low priority level;
obtaining monitoring information ($I_{Monit}$), said information comprising at least one of:
an information representative of a monitored activity of the program during a predetermined time period, and
an information representative of a learnt user's habit of use of the program, said information comprising a number of times the program gained the focus within the predetermined time period;
deriving a dynamic score delta from said monitoring information, said dynamic score delta being positive or negative, said deriving comprising applying a score decrement value to said dynamic score delta at each focus gained by the program;
adjusting the obtained score (AM-SC) of the said at least one program by adding said dynamic score delta to the obtained score; and
terminating an execution of at least one program of said plurality of programs, when said memory swap size limit (SL) is reached and the adjusted score associated with said at least one program is equal to or higher than a separate priority threshold (PT) associated with score value for said plurality of programs corresponding to said reached memory swap size limit.

* * * * *